Patented May 17, 1949

2,470,193

UNITED STATES PATENT OFFICE 2,470,193

TREATMENT OF HYDROCARBONS

William M. Stratford, New York, N. Y., assignor, by mesne assignments, to The Texas Company, New York, N. Y., a corporation of Delaware No Drawing. Application December 31, 1940, Serial No. 372,493

1 Claim. (Cl. 196—52)

The present invention relates to the catalytic treatment of hydrocarbons, particularly petroleum hydrocarbons. The invention especially relates to a catalyst for use in effecting the molecular conversion of hydrocarbons, such as the conversion of high molecular weight hydrocarbons into low molecular weight hydrocarbons which are suitable for use as fuel for internal combustion motors, and the reforming of virgin and cracked hydrocarbon distillates.

The principal object of the invention is to provide a novel and efficient catalyst adapted for use in effecting the molecular conversion of hydrocarbons, especially the cracking of hydrocarbon oils to produce a high yield of desired products.

In the usual process for catalytically cracking hydrocarbon oils the oil to be cracked is heated and vaporized and the hot vapors are brought into contact with a solid catalyst under controlled conditions of temperature and pressure. The reaction products, which include gas, gasoline hydrocarbons and higher boiling hydrocarbons, are separated in conventional ways. During the conversion, carbon is deposited on the catalyst, reducing its activity and ability to catalyze the hydrocarbon conversion. When the activity of the catalyst has been reduced it becomes necessary to regenerate the catalyst. This is usually accomplished by burning off the carbon in a stream of air or other oxygen-containing gas. After regeneration the catalyst may be reused in cracking additional quantities of oil. It has also been proposed to carry out the cracking process by introducing a catalyst in powder form into the hydrocarbon vapors to be treated. In this case it is important that the catalyst should be in finely divided form so as to be capable of being suspended in the flowing hydrocarbon vapors. Another process has been proposed which is carried out while maintaining the hydrocarbon oil substantially in the liquid phase and the catalyst in finely divided form is suspended in the hydrocarbon oil undergoing treatment.

Varied types of materials have been suggested for use as catalysts in the catalytic cracking of hydrocarbon oils. For example, it has been proposed to employ such materials as fuller's earth, kieselguhr, activated clays, artificial zeolites and synthetic compositions composed essentially of alumina and silica.

In approaching the problem of developing catalysts suitable for use in the cracking of hydrocarbon oils it should be recognized that a satisfactory catalyst should possess a number of properties, possibly unrelated. It is of primary importance that the use of the catalyst should result in a good yield of gasoline and that the gasoline have a relatively high octane value. Further, it is important that the catalyst should be relatively heat stable and thus capable of satisfactory regeneration. The regeneration of a catalyst which has been used in cracking involves buring off carbon deposited during cracking. This procedure is usually carried out at temperatures above the temperatures maintained during cracking and because of the exothermic nature of the regeneration reaction excessive heat is often developed. A catalyst lacking heat stability, therefore, is not attractive from a practical standpoint because the catalyst will be short-lived. It is also important that a suitable catalyst should not cause the deposition of excessive amounts of free carbon. Carbon deposited on a catalyst not only reduces the catalytic activity but also complicates the problem of regeneration and reduces the over-all yield of desirable hydrocarbons.

The present invention is based upon the discovery that complex hydrated magnesium silicates, such as the crystalline magnesium silicates described in more detail below, possess valuable catalytic properties for effecting the molecular conversion of hydrocarbons. It has been found that by passing petroleum cracking stocks into contact with the complex magnesium silicates under the usual conditions maintained during catalytic cracking excellent yields of gasoline are obtained. These magnesium silicates are relatively heat stable and may be subjected to temperatures of the order of those encountered in regeneration operations without damage. Indeed it appears that heating these materials to relatively high temperatures serves to increase their activity. In general, the catalysts of the invention, as compared with other catalysts producing comparable yields of gasoline, possess a lesser tendency to form carbon, thus reducing regeneration problems. Also, the complex silicates are inexpensive as compared with catalysts of comparable activity and hence are especially important from an economic standpoint.

The complex magnesium silicates are synthetic materials regarded as having the type formula $xMgO \cdot ySiO_2 \cdot nH_2O$ in which the letters $x$, $y$, and $n$ are subject to considerable variation. A magnesium silicate of this type is marketed under the trade name Magnesol. As prepared this product is a white, powdery, crystalline substance, which possesses adsorbent properties. It is characterized by its ability to effect the decolorization of petroleum lubricating oils at elevated temperatures, the most efficient temperatures for use being in the neighborhood of 400° to 500° F. For example, this material has been used successfully in the decolorization of cylinder stocks having a Saybolt Universal viscosity of 150 at 210° F., the decolorization being carried out at temperatures of about 400° F. and with the use of 2 to 12 per cent of the magnesium silicate based on the weight of the oil, the amount used being dependent upon the initial color of the oil and the extent of decolorization desired.

In general, magnesium silicates of the type in question are synthesized by reacting a calcium silicate in the presence of water with a soluble magnesium salt, preferably magnesium chloride or magnesium sulfate, so as to replace the calcium of the calcium silicate with magnesium and to cause the calcium to become associated with the anion of the magnesium salt employed. Complex magnesium silicates of this type are disclosed in U. S. Patent 2,076,545 to Lyle Caldwell. It is preferred to employ magnesium silicates which are prepared by reacting an alkali metal silicate, such as sodium silicate, in aqueous solution with lime to form calcium silicate and then reacting the calcium silicate with a soluble magnesium salt as described above. The desirable magnesium silicate is precipitated in finely divided form. In preparing these materials it is important to remove the alkali metals from the product and it is also desirable to remove most of the calcium.

Also, the synthetic magnesium silicate may be prepared in accordance with the disclosure in Caldwell Patent No. 2,076,545. Thus, finely divided silica and hydrated lime in about equal proportions may be suspended with agitation in an aqueous solution of soluble magnesium salt, such as magnesium chloride, and heated under pressure for a period of one to three hours at a temperature of 400 to 450° F. The resulting product may be water-washed to remove soluble salts and then be dried to produce the final product.

The complex magnesium silicates may be used in the form of pellets prepared by first mixing the silicates with a suitable binding material. Catalysts of the invention may contain essentially only magnesium silicates of they may contain in admixture with the magnesium silicates one or more other materials. The other materials may be relatively inert catalytically or they may possess some catalytic activity. By mixing the magnesium silicates with other catalytic materials, it is often possible to obtain catalysts which possess the valuable properties of the magnesium silicates and also of the other materials. For example, the silicates may be combined with a silica-alumina catalyst to produce a combined catalyst having valuable properties.

Because of the fine texture of the magnesium silicates they are of interest as catalysts in processes wherein powdered catalysts are employed. These processes include those carried out in the vapor and in the liquid phase.

In order that the invention may be understood more fully reference should be had to the following specific examples. It will be understood that these examples are given for illustrative purposes merely and are not intended as limitations of the invention.

*Example I.*—The catalyst employed in this example consisted of a complex magnesium silicate marketed under the trade name Magnesol and designed especially for use as an agent for decolorizing petroleum oils. 500 parts by weight of this product were mixed with 4 per cent by weight flour and 2 per cent by weight stearic acid and the resulting mixture was pelleted and calcined at 1000° F. The catalyst pellets were cylindrical in shape, having a diameter of $\frac{5}{32}$ inch and being ⅛ inch in height. The apparent density of the catalyst in grams per cubic centimeter, determined by weighing 180 cc. of the catalyst pellets, was 0.472. Analysis of the catalyst showed that it contained 20 per cent MgO and 69 per cent $SiO_2$, by weight. Also the catalyst contained 2.4 per cent by weight calcium but only a trace of sodium, about .06 per cent. The catalyst contained 4 per cent water by weight as determined by heating a portion of the catalyst from 1000° to 1800° F.

This catalyst was employed in the cracking of virgin gas oil having an end boiling point of 700° F. and derived as a distillate from East Texas crude. The vaporized gas oil, heated to about 1000° F., was charged continuously to a tower packed with the catalyst pellets at a space velocity of 2.2 (400 cubic centimeters liquid gas oil per hour per 180 cubic centimeters of catalyst pellets). The tower was maintained at a temperature of about 1000° F. and under atmospheric pressure. The total liquid product obtained after a 2 hour period was accumulated and fractionated. The volume per cent yield, basis charge, of 9.5 pounds Reid vapor pressure gasoline having an end point of 400° F. and an octane value (CFRM method) of 75.4, was 24.4 per cent. During a four hour run only 1.0 per cent by weight of the charge had been deposited as carbon. This corresponded to a ratio between the gallons of gasoline and the pounds of carbon deposited of 3.4. A standard catalyst composed largely of silica, and containing a small proportion of alumina and zirconia, which is regarded as of especial value, gave under the same conditions a gasoline-carbon ratio of 2.3.

*Example II.*—This example was carried out in the same manner as Example I, except that before use the catalyst was subjected to a temperature of 1200° F. for six hours. The apparent density of the catalyst was 0.506. The yield of gasoline was 27.6 per cent and the octane value of the gasoline (CFRM) was 78.1. Also, the gasoline-carbon ratio was 5.5. This example shows, therefore, that heating the catalyst improved its properties, and that the catalyst is stable at temperatures up to 1200° F., the temperatures likely to be encountered in regeneration.

*Example III.*—The catalyst used in this example was a combined catalyst containing Magnesol, silica, and alumina. This catalyst was prepared as follows, the parts referred to being by weight:

96 parts of sodium silicate solution (28.5% $SiO_2$, 8.9% $Na_2O$) were dissolved in 3000 parts of water and hydrated silica gel was precipitated by adding dilute hydrochloric acid (equal parts of C. P. reagent hydrochloric acid and water) until the solution was neutral to phenolphthalein. After stirring for 20 minutes, additional dilute hydrochloric acid was added to make the solution acid to Congo red. Dilute ammonium hydroxide was added until the solution was neutral to litmus. The resulting gel was filtered from the solution and washed free of sodium. Separately 99 parts of $AlCl_3.6H_2O$ were dissolved in 5000 parts of water and 250 parts of Magnesol were slurried in this solution. To the resulting slurry, a slurry prepared by mixing the above described silica gel with 3000 parts of water was added. Dilute ammonium hydroxide was then added to the resulting mass until just acid to litmus. This procedure was effective to precipitate $Al_2O_3$ in the mass. The mass was then allowed to stand for nine days, filtered, washed, and filtered again. The washed and filtered material was packed in containers and sweated at 200° F. for four days. It was then dried to a 20 per cent moisture content, ground to 40 mesh, mixed with 4 per cent flour and 2 per cent stearic acid, pelleted, and calcined at 1000° F. for 2½ hours. The resulting catalyst had an apparent density 0.605, and analyzed 12.9 per cent by weight MgO, 69.1 per cent $SiO_2$, and 9.6 per cent $Al_2O_3$. It contained 3.3 per cent water by weight as determined by heating a portion of the catalyst to 1800° F.

The catalyst was used in a cracking operation as described in Example I. The yield of gasoline was 28 per cent and the octane value of the gasoline (L3 method) was 82.9. The gasoline-carbon ratio was 2.3.

It will thus be seen that the catalysts of the invention, whether containing only the magnesium silicates or made up of the silicates and other materials, yield valuable results. As shown by the analysis the magnesium silicates are in hydrated form. With respect to the variations in the molal ratio between magnesia and silica in the silicates, it may be stated that silicates in which this ratio varies from 1:1 to 2:5 are of especial interest. In the preferred materials, the molal ratio between the magnesia and the silica is about 1:2.3, and the magnesia and silica together make up about 90 per cent by weight of the materials. In this connection, however, it should be understood that where a magnesium silicate is combined with additional silica to produce a combination catalyst, the proportion of silica present in the catalyst actually used will be higher than indicated by these ratios.

In carrying out a conversion process in accordance with the invention using a magnesium silicate, it will be understood that the conditions maintained will normally be the same as in previously proposed processes using other catalysts. For example, in vapor phase cracking the temperatures may be maintained from 700° F. upwards, for example they may vary from 700° F. to 1100 F., although it is preferred to operate at temperatures withing the range of 900° to 1100° F. The pressure also may be varied, for example, from atmospheric to about 100 pounds per square inch or higher. In a process carried out by passing hydrocarbons in contact with a solid catalyst, which may be in the form of pellets, under certain conditions of temperature and pressure the hydrocarbons charged may be substantially in the liquid phase during the reaction.

When the process is carried out by passing the hydrocarbons to be treated through a body of solid catalyst, various space velocities may be selected. In general, depending upon the temperature and pressure maintained and other conditions of operation, the space velocity will ordinarily vary from about 1 to 10.

Since changes may be made in the products and processes described above without departing from the scope of the invention, it is intended that the description shall be taken as illustrative and not in a limiting sense.

I claim:

A method of converting higher boiling hydrocarbons to hydrocarbons of lower boiling point comprising vaporizing the higher boiling hydrocarbons and passing the vapors for a time sufficient to effect a substantial amount of such conversion, in contact at a cracking temperature with a magnesium silicate catalyst produced by subjecting lime and silica to reaction with a soluble magnesium salt in the presence of water at a superatmospheric temperature.

WILLIAM M. STRATFORD.

REFERENCES CITED

The following references are of record in the file of this patent:

UNITED STATES PATENTS

| Number | Name | Date |
|---|---|---|
| 1,598,254 | Prutzman et al. | Aug. 31, 1926 |
| 1,603,314 | Caldwell | Oct. 19, 1926 |
| 1,802,628 | Caldwell | Apr. 28, 1931 |
| 2,076,545 | Caldwell | Apr. 13, 1937 |
| 2,163,525 | Caldwell | June 20, 1939 |
| 2,163,526 | Caldwell | June 20, 1939 |
| 2,163,527 | Caldwell | June 20, 1939 |
| 2,278,590 | Ruthruff | Apr. 7, 1942 |
| 2,281,919 | Connolly | May 5, 1942 |

FOREIGN PATENTS

| Number | Country | Date |
|---|---|---|
| 386,669 | Great Britain | Jan. 9, 1933 |
| 504,614 | Great Britain | Apr. 24, 1939 |